Nov. 20, 1934.  B. W. SHIELDS  1,981,077
SPRAY GUN
Filed April 28, 1933
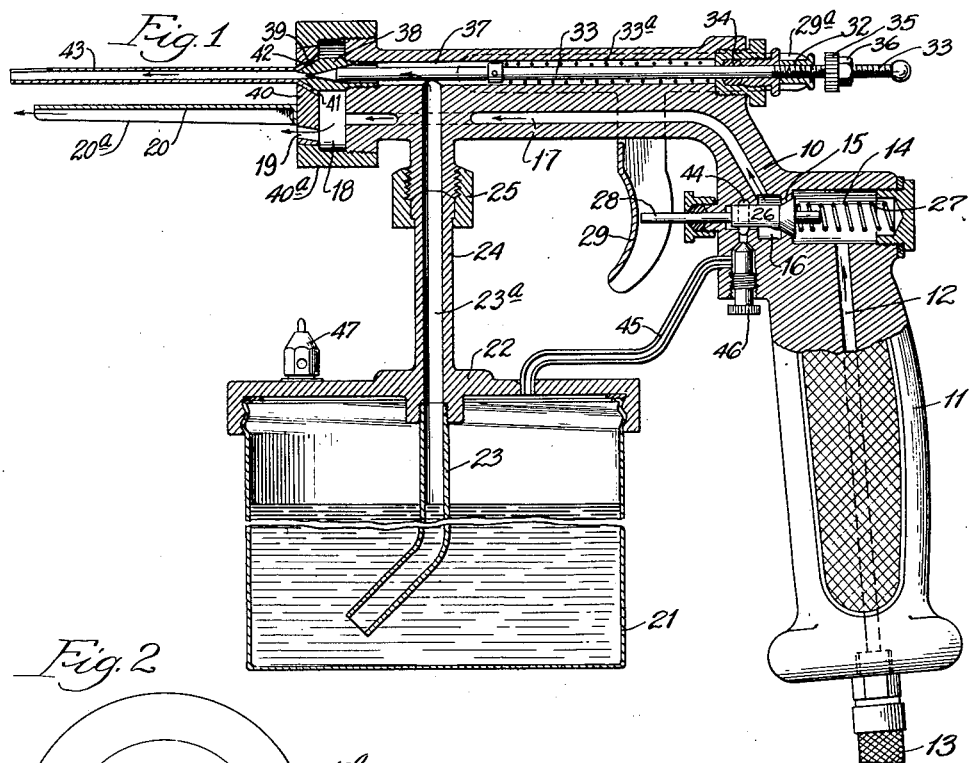
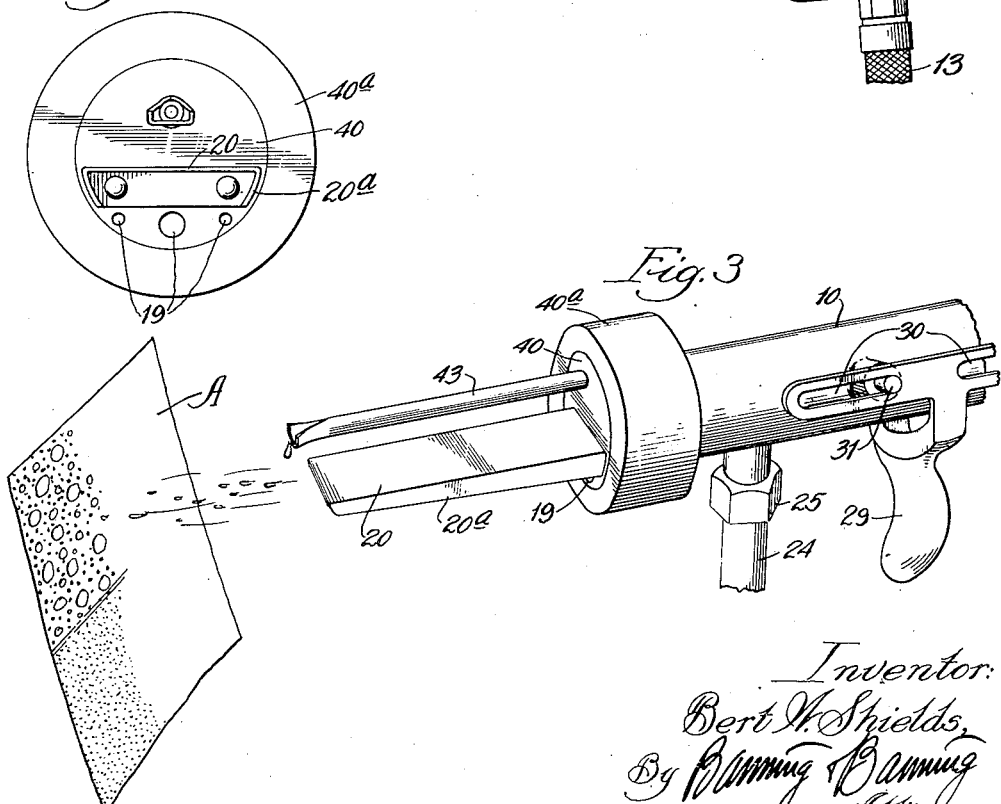
Inventor:
Bert W. Shields,
By Banning & Banning
Attys.

Patented Nov. 20, 1934

1,981,077

UNITED STATES PATENT OFFICE 1,981,077

SPRAY GUN

Bert W. Shields, Chicago, Ill., assignor to Joseph Weidenhoff, Inc., Chicago, Ill., a corporation of Illinois Application April 28, 1933, Serial No. 668,341

7 Claims. (Cl. 299—89)

An object of this invention is to provide an improved form of device for spraying paint, varnish, liquid color, and the like upon a surface in the form of droplets of controllable sizes.

This and other objects, as will hereinafter appear, are accomplished by this invention which is fully described in the following specification and shown in the accompanying drawing, in which—

Figure 1 is a vertical section through the spray gun;

Fig. 2 is an enlarged front elevation of the discharge end of the device; and

Fig. 3 is a partial perspective showing the device in operation.

The embodiment illustrated comprises a body 10 having a handle 11 which has an opening 12 therethrough connected to an air hose 13 which is attached to a suitable source of air pressure. The opening 12 leads to a chamber 14 which connects through a valve seat 15 with a recess 16. This recess connects through a passage 17 with an enlargement 18, which has holes 19 drilled in its forward wall so as to extend upwardly toward a plate 20 secured to the forward wall, and having side walls 20ª for guiding a stream of air issuing from the holes 19.

A container 21 for carrying the liquid to be sprayed has a cap 22 secured thereon as by means of screw threads, and this has a pipe 23 extending to a point near the bottom of the container which connects with a passage 23ª in the stem 24, which is connected by means of a coupling 25 with the forward end of the body.

A valve 26 is slidably mounted in the chamber 14 and is urged against the valve seat 15 by means of a spring 27, so that this seat is normally closed. The valve has an extension 28 extending through a suitable packing gland in the side of the body and making contact with a trigger 29 which is adapted to be operated by the finger of the operator, the trigger being bifurcated and having slots 30 (Fig. 3) which are guided on suitable pins 31, two on each side of the body 10.

The rear end 29ª of the trigger (Fig. 1) engages a thimble 32 which is hollow, and is slidable on a pin 33 which in turn is slidable through a suitable stuffing box 34 in the rear of the body. A nut 35 is adjustable on the screw-threaded pin 33 and is locked thereon by means of a lock nut 36 in any adjusted position. The pin 33 extends throughout the length of a bore 37, and has its forward end tapered to fit a conical seat 38 in a nipple 39 which is threaded into the forward end of the bore 37. The pin 33 is normally forced to the left, as shown by means of a spring 33ª. This bore connects with the passage 23ª which leads to the container 21.

A disk 40 has a tapered hole 41 which is adapted to lie immediately in front of the nipple 39 so as to firmly grip a flared end 42 of a tube 43, which is thus held above and substantially parallel to the plate 20. This tube is preferably split at the end as shown in Fig. 3, and has its end flattened so as to assist in spreading fluid which is passed therethrough. The disk 40 is held in place by means of a screw coupling 40ª.

The recess 16 connects with a passage 44 through a channel in the valve 26, and this through a pipe 45 with the top of the container 21. While the pressure on the air hose 13 may amount to many pounds, it is desirable that the pressure in the container should be only a few ounces. For this purpose a screw-threaded needle valve 46 is provided for regulating the pressure on the liquid in the container. If desired, I may use instead of the valve 46 an automatic pressure regulating valve for this purpose. In the present instance, however, a relief spring 47 is used for preventing the pressure exceeding a predetermined maximum.

The operation of the device is as follows: Some liquid to be sprayed having been placed in the container and the hose 13 connected to a suitable source of air supply, the operator grasps the handle and presses on the trigger 29, thereby raising the valve 26 off its seat and admitting air to the passage 17. This air passes out through the holes 19 under the plate 20 and provides a moving stream of air for breaking up drops of material to be sprayed, and will soon be described.

As the valve 26 is moved off its seat, pressure from the line forces some air past the valves 26 and 46 into the pipe 45, and thus produces a pressure which causes some of the liquid in the container to be forced up through the passage 23ª into the bore 37. Up to this time the pin 33 has not been drawn back so as to permit liquid to flow through the tube 43. As the trigger 29 is drawn farther back, however, it engages the nut 35, thereby withdrawing the pin 33 and uncovering the valve seat, thus permitting some of the liquid to flow through the tube 43. As it does so, the liquid drips off the end of the tube, as shown in Fig. 3, and these drops fall through the rapidly moving and churning air stream filled with eddy currents issuing from beneath the plate 20, with the result that the drops are broken up into small droplets and these are carried forward and dispersed by eddy currents in the stream of air.

The result is that when paint, varnish, and the like are thus sprayed upon a surface A, a very artistic distribution of these drops is obtained. The size of droplets thus formed may be varied by using different air pressure on the line by thinning the liquid to be sprayed and the like. It will also be apparent that the valve 45 may be entirely closed and the liquid to be sprayed may be fed by gravity to the bore 37 from an elevated container.

Thus it will be seen that a very simple and efficient form of spray gun has been devised, and one which is very sturdy and which adapts itself for use with different liquids to be sprayed with a minimum of labor. It is particularly adapted for heavy bronze lacquers, and the like.

While I have shown and described but a few embodiments of my invention, it is to be understood that it is capable of many modifications. Changes, therefore, in the construction and arrangement may be made which do not depart from the spirit and scope of my invention as disclosed by the appended claims.

I claim:

1. In a spraying device of the class described, a body, a tube secured thereto, a container for liquid, a passage connecting said container with the tube, a valve in said passage, means for forcing liquid from the container to said passage, a plate underlying said tube and spaced therefrom, and means for directing a stream of air beneath the plate so that as drops of liquid issue from the tube they fall into the stream of air and are broken up and dispersed by it.

2. In a spraying device of the class described, a body, a tube secured thereto, a container for liquid, a passage connecting said container with the tube, a valve in said passage, means for forcing liquid from the container to said passage, a plate underlying said tube and terminating short of the end of the tube and spaced therefrom, and means for directing a stream of air beneath the plate so that as drops of liquid issue from the tube they fall into the stream of air and are broken up and dispersed by it.

3. In a spraying device of the class described, a body, a tube secured thereto, a container for liquid, a passage connecting said container with the tube, a valve in said passage, means for forcing liquid from the container to said passage, a plate underlying said tube and spaced therefrom, and means for directing a stream of air beneath the plate so that as drops of liquid issue from the tube they fall into the stream of air and are broken up and dispersed by it, the end of the tube being flattened substantially parallel to the plate.

4. In a spraying device of the class described, a body having a passage therein for liquid terminating in a tube, means for feeding a liquid to be sprayed to said passage, the body also having an air passage, means for applying air pressure to the air passage, an air valve in the air passage and a liquid valve in the liquid passage, a single means for controlling both valves, the air valve being opened in advance of the liquid valve, a plate underlying said tube and spaced therefrom, said air passage communicating with the space beneath said plate so as to cause a stream of air to pass longitudinally beneath the plate and to disperse drops of liquid issuing from the tube.

5. In a spraying device of the class described, a body, a tube secured thereto, a container for liquid, a passage connecting said container with the tube, a valve in said passage, a pipe connecting the container with a source of air pressure for forcing liquid from the container to said passage, a plate underlying said tube and spaced therefrom, and means for directing a stream of air beneath the plate so that as drops of liquid issue from the tube they fall into the stream of air and are broken up and dispersed by it.

6. In a spraying device of the class described, a body, a tube secured thereto, a container for liquid, a passage connecting said container with the tube, a valve in said passage, means for forcing liquid from the container to said passage, a plate underlying said tube and spaced therefrom, and means for directing a stream of air beneath the plate so that as drops of liquid issue from the tube they fall into the stream of air and are broken up and dispersed by it, both said means being connected to a source of air pressure.

7. In a spraying device of the class described, a body, a tube secured thereto, a container for liquid, a passage connecting said container with the tube, a valve in said passage, a pipe connecting the container with a source of air pressure, means for reducing the pressure in the container to a small fraction of the pressure at the source of air pressure for forcing liquid from the container to said passage, a plate underlying said tube and spaced therefrom, and means for directing a stream of air beneath the plate so that as drops of liquid issue from the tube they fall into the stream of air and are broken up and dispersed by it.

BERT W. SHIELDS.